United States Patent [19]

Irmler

[11] Patent Number: 4,795,166
[45] Date of Patent: Jan. 3, 1989

[54] SEALING GASKET

[75] Inventor: Josef Irmler, Münsing, Fed. Rep. of Germany

[73] Assignee: Feodor Burgmann Dichtungswerke GmbH & Co., Wolfratshausen, Fed. Rep. of Germany

[21] Appl. No.: 847,922

[22] Filed: Apr. 3, 1986

[30] Foreign Application Priority Data

Apr. 10, 1985 [DE] Fed. Rep. of Germany ....... 3512842

[51] Int. Cl.$^4$ ............................................. F16J 15/10
[52] U.S. Cl. .......................................... 277/1; 277/26;
    277/227; 277/233; 277/235 B; 277/DIG. 6;
    285/187; 285/368; 285/910; 428/324; 428/363;
    428/454
[58] Field of Search ................... 277/26, 227, 235 B,
    277/233, 234, 235 R, DIG. 6, 235 A, 1;
    285/368, 412, 910, 187; 428/324, 363, 454

[56] References Cited

U.S. PATENT DOCUMENTS

| | | | |
|---|---|---|---|
| 687,531 | 11/1901 | Jefferson | 428/324 |
| 1,863,521 | 6/1932 | Crane | 277/235 B X |
| 2,084,054 | 6/1937 | Balft | 277/233 X |
| 2,210,453 | 8/1940 | Ginn | 277/235 B X |
| 2,562,004 | 7/1951 | Watson, Jr. et al. | 428/324 |
| 2,729,483 | 1/1956 | Victor | 277/235 B X |
| 2,949,150 | 8/1960 | Traynor, Jr. | 428/32 X |
| 3,740,062 | 6/1973 | Robins | 277/235 B |
| 3,924,863 | 12/1975 | Nakano et al. | 277/235 B |
| 3,970,322 | 7/1976 | Stecher et al. | 277/235 B X |
| 4,029,635 | 6/1977 | Merrill | 428/454 X |
| 4,061,344 | 12/1977 | Bradley et al. | 277/26 |
| 4,209,177 | 6/1980 | Hall | 285/368 X |
| 4,371,579 | 2/1983 | McCaskey et al. | 428/324 X |
| 4,441,721 | 4/1984 | Harris et al. | 277/26 |
| 4,463,959 | 8/1984 | Usher et al. | 277/235 R |
| 4,546,033 | 10/1985 | Tsuchimoto et al. | 277/DIG. 6 |
| 4,556,097 | 12/1985 | Burmeister | 222/597 X |
| 4,601,952 | 7/1986 | Doyle et al. | 428/324 X |

FOREIGN PATENT DOCUMENTS

| | | | |
|---|---|---|---|
| 1367422 | 6/1964 | France . | |
| 363377 | 10/1938 | Italy . | |
| 9304 | 2/1983 | Japan | 277/235 B |

Primary Examiner—Allan N. Shoap
Attorney, Agent, or Firm—Spencer & Frank

[57] ABSTRACT

A high-temperature resistant sealing gasket, adapted to be clamped between flanged pipe ends for service in a static environment, comprises a flat mica mat including, in a superposed relationship, a great number of mica scales, each formed of a plurality of stacked, extremely thin mica platelets held together by natural cohesion. The mica scales are oriented, with their largest opposite faces, essentially parallel to the opposite mat surfaces. The mica mat further includes a binder situated between overlapping zones of immediately superposed scales. Particular materials for the mica scales and the binder are selected such that the mica mat, in a non-installed state, has the property of undergoing, when heated, a thickness increase in a direction perpendicular to the largest scale faces. The thickness increase starts at a temperature of about 500° C. and reaches, at 800° C., 100% relative to the thickness at 20° C.

10 Claims, 2 Drawing Sheets

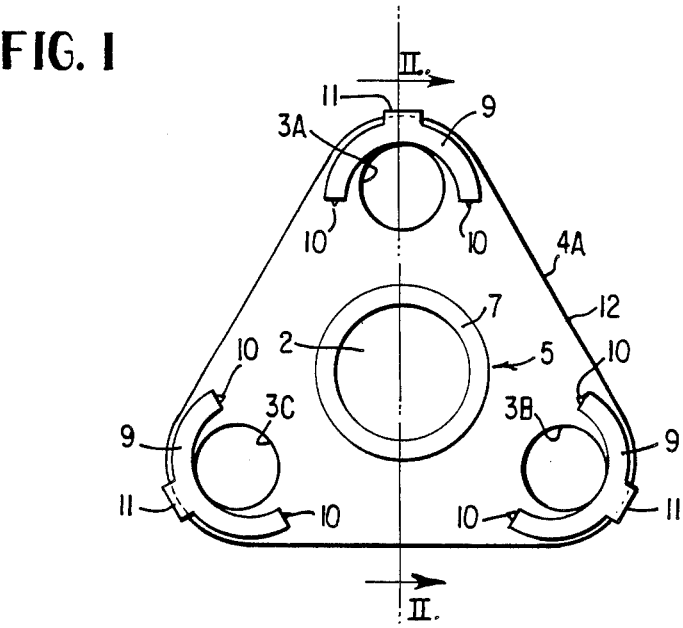
FIG. I
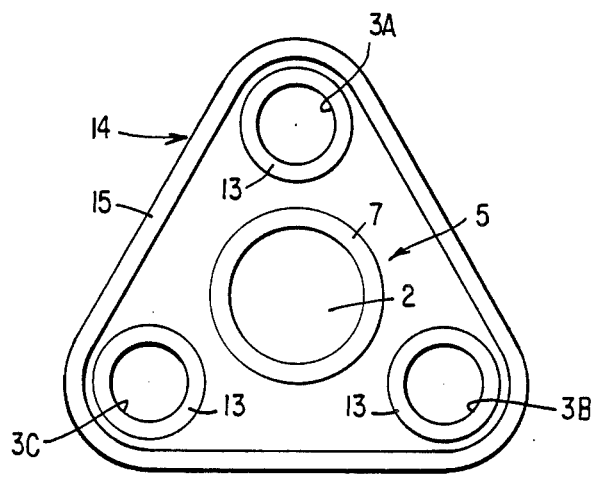
FIG. IA

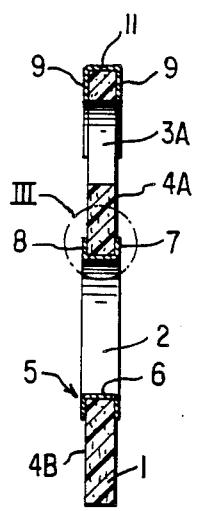
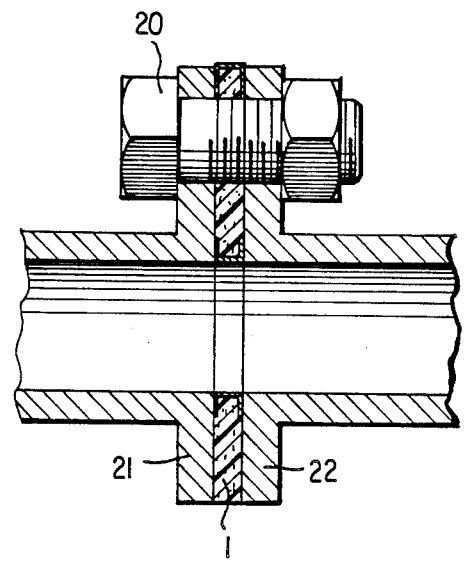
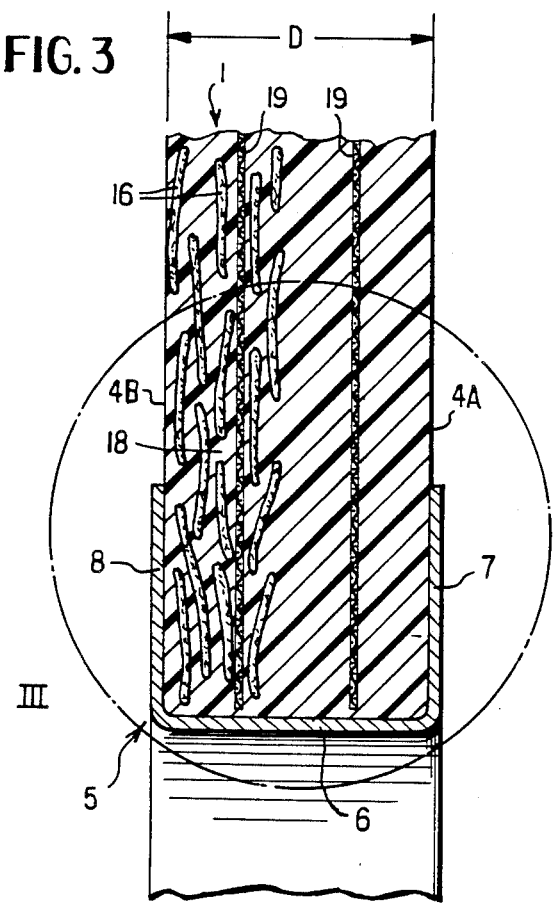
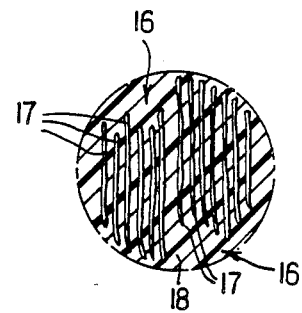

SEALING GASKET

BACKGROUND OF THE INVENTION

This invention relates to a sealing gasket for use in a static environment. The gasket is of the type which has a non-metallic basic body for providing a seal between two face-to-face arranged flanges at operating temperatures of over 500° C., for example, for use in exhaust pipes of internal combustion engines.

Sealing gaskets of the above-outlined type are known. They conventionally have a flat basic body of pure graphite or asbestos which is usually reinforced by apertured sheet metal parts or a metal web. Apart from the fact that asbestos is presently sought to be replaced by other materials, these known gaskets have not been able to perform with the required durability and sealing effect in all applications, particularly when used at temperatures well in excess of 500° C. Failure to seal properly is often the result of temperature-caused deformations of the flanges (and tightening bolts), causing a distortion of the originally planar and essentially parallel seating faces between which the gasket is clamped. Such deformations cause the appearance of gaps which, particularly after a longer service period, cannot be filled by virtue of the own elasticity of the sealing gasket.

There are further known gaskets designed for use in angularly movable joints. Such seals have a spherical sealing face which slidably engages a complementally formed counter-face of the joint flange. For these types of uses it is known to wind the gasket body of ribbons constituted by a woven or mesh metal structure which encloses mica material.

It is known that natural mica materials may be split into layers by treating them with reactive solvents, with or without a simultaneous application of higher temperatures. The mica layers or scales (flakes) obtained in such a manner are further pocessed, with the addition of binders, to obtain foils, plates or shaped components which are used, for example, in the electro-industry, particularly if the component is required to preserve its original shape at higher temperatures.

Binder-free mica is further used in an environment of chemically corrosive media as sealing plates or protective layers.

There are further known mica materials such as vermiculite which are expanded to a significantly increased volume at high temperatures. These materials have been used heretofore for secondary purposes such as packaging or heat insulation.

SUMMARY OF THE INVENTION

It is an object of the invention to provide an improved sealing gasket of the above-outlined type which is inexpensive to manufacture, which may be used between flanges with planar sealing faces and which ensures a superior seal even if temperature-caused distortions of the seating faces and/or changes of their mutual position occur.

This object and others to become apparent as the specification progresses, are accomplished by the invention, according to which, briefly stated, the sealing gasket is formed of a flat mica mat (gasket body) having at least one aperture and further, the mica mat comprises a great number of superimposed flat mica scales, each of which, in turn, is formed of a plurality of extremely thin mica platelets held together by natural cohesion. The mica scales are, with their largest surfaces, essentially parallel with the outer faces of the flanges intended as a seat for the gasket. Further, the mica mat contains a binder layer which extends between adjoining, superposed mica scales in the overlapping zone thereof. The mica scales and the binder layer are of materials such that the mica mat undergoes, in an unclamped state, a progressive thickness increase measured perpendicularly to the largest plane dimension of the mica scales. Such thickness increase starts at a temperature of approximately 500° C. and is, relative to the thickness at 20° C., at least 10% at 600° C. and at least 100% at 800° C. Preferably the thickness is at least 30% at 500° C. and substantially more than 30% at 600° C.

A gasket of the above-outlined construction undergoes an increase in thickness at higher temperatures where appreciable distortions or distance changes in the seating faces of the flanges begin to appear. Such an increase in thickness compensates for any gap formed between the outer faces of the gasket and the seating faces of the flanges. It has been found that even after such a thermally induced thickness increase of the mica mat occurs, an appreciable inherent elasticity of the material is preserved so that even after a great number of temperature fluctuations the gasket retains a superior sealing effect.

According to a further feature of the invention, the binder layer of the mica mat extends at least between the edge zones of superposed mica platelets, resulting in an increased stability of the gasket in its state prior to installation, while ameliorating the thermally induced thickness increase of the gasket in operation. The binder layer of the mica mat is preferably a synthetic resin; the use of a flexible silicone synthetic resin with functional groups has been found as particularly advantageous. While other types of mica, such as muscovite, may be used according to the invention, a particularly expedient material has been found to be phlogopite mica for the mica scales.

Particularly in gaskets whose thickness is significantly larger than 1 mm, it has been found to be advantageous to include in the mica mat at least one carrier member, for example, a thin steel wire fabric, which extends essentially parallel to the outer faces and is situated between layers of the mica scales. The carrier component may also be made of a ceramic material, paper or the like.

It is advantageous, for practically all modes of application, to provide each aperture of the gasket with a sheet metal frame which, with its opposite, ring-like flanges extends over the opposite outer faces of the gasket. Such a sheet metal frame only very slightly impedes the desired, temperature-induced thickness increase of the mica mat, while it ensures its mechanical cohesion and prevents the fluid to be sealed off from penetrating between the individual layers of the mica scales or between the very thin mica platelets which would cause a chemical or mechanical corrosion thereof.

Dependent on the size of and the operational conditions for the sealing gasket, the latter may include a frame which is applied about the entire outer gasket periphery and whose two strip-like flanges project over the opposite outer faces of the gasket. Such a frame, although it slightly hinders the desired, temperature-induced thickness increase of the gasket, lends to the gasket a significantly increased mechanical stability.

Instead of providing a frame along the outer circumference, the gasket which has further apertures for the passage of tightening components (such as bolts) for the flange, has, at such additional apertures, frames which are similar to the principal aperture which serves as a passage for the fluid to be sealed. The prevention of a temperature-induced thickness increase which would otherwise be caused by such an arrangement is for all practical purposes entirely avoided if the additional apertures in the gasket are surrounded by a semicircular frame only along that peripheral portion of the aperture which is oriented away from the gasket aperture or apertures through which the medium to be sealed flows. The sheet metal half-frames associated with the additional openings in the gasket are at their outer edges connected with one another by means of an integral sheet metal strip which extends around the outer periphery of the sealing gasket. These sheet metal components hold together the outer faces of the mica mat only in those zones which are of no significance for the sealing effect.

BRIEF DESCRIPTION OF THE DRAWING

FIGS. 1 and 1A are top plan views of two gaskets incorporating the invention.

FIG. 2 is a sectional view taken along line II—II of FIG. 1.

FIG. 2a is a sectional view of a flange assembly incorporating the invention.

FIG. 3 is a significantly enlarged detail of the inset III of FIG. 2, illustrating a preferred embodiment of the invention.

FIG. 4 is a significantly enlarged detail of FIG. 3.

DESCRIPTION OF THE PREFERRED EMBODIMENTS

Turning now to FIGS. 1, 2 and 2a, the sealing gasket is prepared, by stamping or other shaping, from a gasket mat 1 made of mica material which will be described in greater detail later. The thickness (designated at D in FIG. 4) of the gasket may range from a fraction of a millimeter to several millimeters. The gasket has essentially the shape of an equilateral triangle having rounded corners and is provided with a central circular passage (main opening) 2 as well as three additional circular passages 3A, 3B and 3C which surround the central opening 2 and which are arranged at 120° from one another related to the center of the opening 2. The passages 3A, 3B and 3C are of equal distances from the center of the opening 2 and are situated in the respective rounded corner zone of the triangular gasket. The central opening 2 serves as a passage for the fluid medium to be sealed, whereas the additional openings 3A, 3B and 3C serve for the passage of tightening means, such as bolts 20 (one shown in FIG. 2a) to tighten two flanges 21 and 22 to one another which are to be sealed by the gasket and which have essentially planar, respective seating faces oriented to one another and adapted to lie flat against opposite parallel outer faces 4A and 4B of the gasket 1.

The central opening 2 has a sheet metal frame (armor) 5 which has a central, generally cylindrical part 6 conforming to the inner circumferential surface of the gasket wall defining the opening. On opposite sides, from the central cylindrical portion 6 there extend annular integral parts 7 and 8 radially outwardly which press with a bias against the respective outer surfaces 4A and 4B of the gasket 1.

Each of the additional passages 3A, 3B and 3C - is partially surrounded along a peripheral portion oriented away from the central opening 2, by two semicircular, annular sheet metal parts 9 engaging the gasket surfaces 4A and 4B. The inner radius of each sheet metal part 9 is slightly larger than the radius of the associated opening and the outer radius of each part 9 is slightly smaller than the radius of curvature of the rounded corners of the gasket 1. On each free end of the sheet metal part 9 there is integrally formed a claw-shaped extension 10 which is bent approximately at right angles to the part 9 and pressed into the gasket material. The two sheet metal parts 9 associated with each opening 3A, 3B and 3C are connected with a sheet metal strip 11 to one another to form a unitary structure which extends about the outer periphery 12 of the seal. In this manner, the two parts 9 at each additional opening form an integral, one-piece structure.

According to a modification of the gasket illustrated in FIG. 1A, instead of the sheet metal parts 9 for the openings 3A, 3B and 3C there are provided frames 13 which are configured similarly to the frame 5 for the central opening 2.

As also shown in FIG. 1A, the gasket 1 may be provided with a frame 14 extending along its entire external periphery 12 and having two strip-like components 15 lying flat on opposite faces 4A and 4B of the gasket 1.

Each frame component 5, 9, 13 and 14 is of sheet metal whose thickness and material is so selected that the force pressing the two flanges together is opposed only by a slight resistance, that is, the sealing engagement of the flange faces on the outer faces 4A and 4B of the gasket 1 is not appreciably counteracted by the sheet metal components 5, 9, 13 or 14.

Turning now to FIGS. 3 and 4, the mica mat 1 has, as an essential component, a large number of flat mica scales 16 whose largest faces are oriented essentially parallel to one another and to the opposite outer faces 4A and 4B and are, in several layers, in a randomly overlapping relationship. The mica scales 16 are phlogopite mica, it being understood that for particular uses there may be prepared a mixture with other types of mica and also, exclusively, other mica types, such is muscovite mica may be used. As shown in FIG. 4, each mica scale 16, in turn, is formed of a plurality of extremely thin mica platelets 17 held together by natural cohesion.

At least in the overlapping zones of immediately superposed mica scales 16 there is arranged a binder layer 18 which is a flexible silicone resin with functional groups. The binder layer 18 projects at least in between edge zones of superposed mica platelets 17.

For special applications and particularly in gaskets whose thickness D is significantly larger than 1 mm, between the layers of mica scales 16 there is provided at least one sheet-like carrier component 19 extending parallel to the outer faces 4A and 4B and made of a temperature-resistant material, such as a thin wire mesh. The carrier component 19 may also be made of a material which, in the temperature range anticipated for the particular application, is not temperature-resistant. In such a case the carrier component merely has the purpose to ensure a better support and form-stability of the gasket prior to its installation.

The gasket mica mat used in the present invention is prepared for example as follows:

Phlogopite mica (raw material) is carefully crushed or milled to receive small mica scales each one consisting of a plurality of very thin mica platelets held together in a sandwich configuration by natural cohesion. The thickness dimension of such mica scales should be within the limits of 0.008 to 0.03 milimetre and the dimensions measured in the direction of their parallel faces (largest faces) should be within the limits of 0.4 to 2.5 millimetres.

Such mica scales are suspended in a liquid (e.g. water) and the suspension is brought up to a wire mesh in a thin mica layer in which the mica scales are randomly distributed having their largest faces oriented parallel to one another. The thickness of such mica layer should be approximately equal to the thickness of the gasket mica mat to be prepared.

The mica layer is then subjected to a dry treatment at temperatures elevated with respect to environal temperature thereby forming a kind of felt of loosely adhering mica scales.

Such mica felt is impregnated with a solution consisting of a flexible silicone resin with functional groups and a solvent. This solution penetrates between the overlapping zones of immediately superposed mica scales and between edge zones of superposed mica platelets. Preferably the said silicon resin is a reactive silanol-functional phenyl-methyl-silicone resin.

The impregnated mica felt is then subjected to a dry treatment at temperature elevated with respect to environal temperatures whereby simultaneously interlacing (hardening/curing) the silicone resin to form the said binder layer 18. The gasket mica mat formed by the steps described above may be pressed between flat plates or may be calandered.

It will be understood that the above description of the present invention is susceptible to various modifications, changes and adaptations, and the same are intended to be comprehended within the meaning and range of equivalents of the appended claims.

What is claimed is:

1. A method of providing a high-temperature resistant seal between end-to-end arranged flanged pipes, comprising the steps of clamping, between flanged pipe ends, a high-temperature resistant sealing gasket having opposite surfaces; the gasket comprising a flat mica mat including, in a superposed relationship, a great number of mica scales, each formed of a plurality of stacked, extremely thin mica platelets held together by natural cohesion; said scales being oriented, with their largest opposite faces, essentially parallel to the opposite gasket surfaces; said mica mat further including a binder situated between overlapping zones of immediately superposed scales; particular materials for said scales and said bineer being selected such that the mica mat, in a non-installed state, has the property of undergoing, when heated, a thickness increase in a direction perpendicular to the largest scale faces; said thickness increase starting at a temperature of about 500° C. and reaching, at 800° C., at least 100% relative to the thickness at 20° C.; and causing the sealing gasket to undergo a thickness increase by heating while said sealing gasket is in an installed state clamped between said flanged pipe ends.

2. A method as defined in claim 1, wherein the binder of said mica mat is situated at least between edge zones of superposed mica scales.

3. A method as defined in claim 1, wherein a substantial proportion of said binder comprises a synthetic resin.

4. A method as defined in claim 3, wherein said binder is a silicone resin with functional groups.

5. A method as defined in claim 4, wherein said silicone resin with functional groups is a reactive silanol-functional phenyl-methyl-silicone resin.

6. A method as defined in claim 1, further mica scales are phlogopite mica.

7. A method as defined in claim 1, further comprising a carrier component embedded in the mica mat between two layers of said mica scales; said carrier component extending essentially parallel to said opposite surfaces.

8. A method as defined in claim 1, wherein said thickness increase reaches, at 600° C., at least 10% relative to the thickness at 20° C.

9. A method as defined in claim 1, wherein said thickness increase reaches, at 500° C., at least 30% relative to the thickness at 20° C. and wherein said thickness increase is continued at least in the temperature range from 500° C. to 800° C.

10. In a high-temperature resistant sealing gasket having opposite surfaces and a plurality of apertures; the gasket being adapted to be clamped between flanged pipe ends for service in a static environment; the improvement wherein the gasket comprises a flat mica mat including, in a superposed relationship, a great number of mica scales, each formed of a plurality of stacked, extremely thin mica platelets held together by natural cohesion; said scales being oriented, with their largest opposite faces, essentially parallel to the opposite gasket surfaces; said mica mat further including a binder situated between overlapping zones of immediately superposed scales; particular materials for said scales and said binder being selected such that the mica mat, in a non-installed state, has the property of undergoing, when heated, a thickness increase in a direction perpendicular to the largest scale faces; said thickness increase starting at a temperature of about 500° C. and reaching, at 800° C., at least 100% relative to the thickness at 20° C.; one of said apertures being a central opening arranged for passage by a fluid in an installed state of the sealing gasket; the other of said apertures being additional openings arranged for passage by tightening elements in an installed state of the sealing gasket; each said additional opening having, along a peripheral portion oriented away from said central opening, two semicircular sheet metal ring members arranged face-to-face with respective said opposite surfaces; the two semicircular sheet metal ring members of each said additional opening being connected to one another, at a radially outer periphery thereof, by an integral sheet metal strip extending around an outer periphery of said mica mat, whereby the two semicircular sheet metal ring members form a one-piece unit.

* * * * *